Patented Oct. 16, 1945

2,387,043

UNITED STATES PATENT OFFICE 2,387,043

5-AMINOHEXAHYDROPYRIMIDINES AND PROCESS FOR PREPARING SAME

Murray Senkus, Terre Haute, Ind., assignor to Commercial Solvents Corporation, Terre Haute, Ind., a corporation of Maryland No Drawing. Application July 29, 1944, Serial No. 547,282

6 Claims. (Cl. 260—251)

My invention relates to a new series of nitrogen-containing compounds. More particularly it relates to 5-aminohexahydropyrimidines and to a process for their preparation. Such compounds may be represented by the following structural formula:

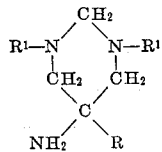

wherein R may be either hydrogen, aryl, alkyl, or hydroxymethyl and $R^1$ may be alkyl, aralkyl, aryl, 2-hydroxyalkyl, dialkylaminoalkyl, or 3,5-dioxacyclohexyl.

The 5-aminohexahydropyrimidines of my invention can be prepared by catalytic hydrogenation of the corresponding 5-nitrohexahydropyrimidines in the liquid phase under pressure. Specifically this process is effected by subjecting the aforesaid nitro derivatives to hydrogenation at normal or elevated temperatures in the presence of a suitable hydrogenation catalyst and a solvent at a temperature which may vary from about 25° to not substantially in excess of 100° C. In general, any hydrogenation catalyst which is active within the aforesaid temperature range may be employed. For the majority of purposes, however, I have found it preferable to utilize Raney nickel. The hydrogenation reaction in general may be effected at hydrogen pressures ranging from about 500 pounds to pressures slightly below those which tend to cleave the hexahydropyrimidine ring. I have found it preferable however to carry out such reactions at a pressure of approximately 1,000 pounds per square inch and at temperatures of between about 25 and 70° C. Suitable solvents which may be utilized in the reduction step are the lower aliphatic alcohols such as methanol, ethanol, and the like.

After the reaction is complete as may be evidenced by the failure of additional hydrogen absorption, the catalyst is separated from the reaction mixture by filtration and the solvent is distilled off. The 5-amino-hexahydropyrimidines obtained in this manner are in general liquids and may be further purified by fractional distillation under high vacuum.

The 5-nitrohexahydropyrimidines employed as starting materials for the preparation of the compounds of my invention are prepared by reacting a suitable primary amine with a nitrohydrocarbon having the nitro group attached to a primary carbon atom in the presence of formaldehyde, the latter being present in a molar ratio of about three to one of the nitrohydrocarbon and two moles of the primary amine. These 5-nitrohexahydropyrimidines may be either liquids or solids and can be purified in accordance with conventional methods. A more detailed description of the methods by which such compounds can be prepared will be found in my copending application, U. S. Serial No. 547,281, filed July 29, 1944.

My invention may be further illustrated by the following specific example.

EXAMPLE

A mixture consisting of 240 g. of 5-nitro-5-methyl-1,3-dibenzylhexahydropyrimidine, 400 ml. of methanol and 10 g. of Raney nickel catalyst was placed in a suitable hydrogenation apparatus and sealed. This mixture was then hydrogenated at a pressure of approximately 1,000 pounds per square inch at an initial temperature of about 25° C. As the reduction proceeded, however, the temperature was gradually increased to approximately 80° C. The hydrogenation required a period of about two hours, during which time the reaction mixture was constantly agitated. After absorption of hydrogen had ceased, the reaction mixture was withdrawn from the hydrogenation apparatus, the catalyst removed from the solution by filtration and the methanol separated from the reaction mixture by means of fractional distillation. The residue thus obtained was then subjected to fractional distillation under high vacuum and 201 g. of 5-amino-5-methyl-1,3-dibenzylhexahydropyrimidine boiling at 178° C. (0.6 mm.) was collected.

The 5-aminohexahydropyrimidines of the present invention are either colorless liquids or white crystalline solids, the lower molecular weight members of the series being soluble in water, methanol, acetone, petroleum ether and benzene, while the higher molecular weight compounds are insoluble in water but are soluble in the other solvents just mentioned. They are in general quite stable compounds, some of which are capable of withstanding temperatures as high as 200° C. and above with only slight decomposition. The following data were determined for certain of the 5-aminohexahydropyrimidines prepared as described above.

Table

| 5-aminohexahydropyrimidine | Boiling point, °C. (mm.) | $d_{20}^{20}$ | $n_D^{20}$ | Per cent nitrogen | |
|---|---|---|---|---|---|
| | | | | Calcd. | Found |
| 5-amino-1,3-dibenzyl-5-methylhexahydropyrimidine | 178 (0.6) | 1.0484 | 1.5659 | 14.23 | 14.15 |
| 5-amino-1,3,5-trimethylhexahydropyrimidine | 69 (10) | 0.9039 | 1.4704 | 29.37 | 29.37 |
| 5-amino-1,3-dimethyl-5-phenylhexahydropyrimidine | 115-117 (0.1) | 1.0053 | 1.5368 | 20.49 | 19.00 |
| 5-amino-1,3-diisopropylhexahydropyrimidine | 105-106 (10) | 0.8794 | 1.4569 | 22.70 | 22.71 |
| 5-amino-1,3-diisopropyl-5-hydroxymethylhexahydropyrimidine | 111 (0.4) | 1.0136 | 1.4845 | 19.53 | 19.22 |
| 5-amino-1,3-diisopropyl-5-methylhexahydropyrimidine | 100 (10) | 0.8828 | 1.4577 | 21.10 | 21.02 |
| 5-amino-1,3-bis(1-methylheptyl)-5-methylhexahydropyrimidine | 167 (0.5) | 0.8648 | 1.4622 | 12.39 | 12.44 |
| 5-amino-1,3-bis(3-dimethylamino-2,2-dimethylpropyl)-5-methylhexahydropyrimidine | 140-141 (0.3) | 0.9261 | 1.4767 | 20.53 | 19.72 |
| 5-amino-1,3-bis(3-dibutylaminopropyl)-5-methylhexahydropyrimidine | 230-233 (0.75) | 0.8892 | 1.4724 | 15.45 | 15.40 |
| 5-amino-1,3-bis(1,1-dimethyl-2-hydroxyethyl)-5-methylhexahydropyrimidine | 162 (0.45) | 1.0544 | 1.4923 | 16.21 | 16.01 |
| 5-amino-1,3-bis(1-methyl-3,5-dioxacyclohexyl)-5-methylhexahydropyrimidine | 175-177 (0.3) | 1.1028 | 1.4891 | 13.33 | 13.26 |
| 5-amino-1,3-bis(1-methyl-3,5-dioxacyclohexyl)-5-ethylhexahydropyrimidine | 170-173 (0.25) | 1.0998 | 1.4905 | 12.76 | 12.94 |
| 5-amino-1,3-diphenyl-5-methylhexahydropyrimidine | 180 (0.15) | 1.0982 | 1.6143 | 15.72 | 15.69 |

The 5-aminohexahydropyrimidines of my invention have been found to be useful in the preparation of numerous organic compounds. Other uses of these products will be apparent to those skilled in the art.

My invention now having been described, what I claim is:

1. As new compositions of matter, 5-aminohexahydropyrimidines.

2. 5-amino-5-methyl-1,3-dibenzylhexahydropyrimidine.

3. 5-amino-5-methyl-1,3-diisopropylhexahydropyrimidine.

4. 5-amino-5-hydroxymethyl-1,3-diisopropyl-hexahydropyrimidine.

5. A process for the preparation of 5-aminohexahydropyrimidines, which comprises subjecting a 5-nitrohexahydropyrimidine to hydrogenation in the liquid phase in the presence of a hydrogenation catalyst at elevated pressure and at a temperature of from about 25 to about 100° C.

6. As new compositions of matter, 5-amino-1,3-disubstitutedhexahydropyrimidines.

MURRAY SENKUS.